United States Patent [19]

Idema

[11] Patent Number: 5,020,408
[45] Date of Patent: Jun. 4, 1991

[54] TOOL FOR OBLIQUELY SEVERING FLOWER STEMS

[76] Inventor: Gert Idema, Penninghoek 1, 4331 PN Middelburg, Netherlands

[21] Appl. No.: 483,033

[22] Filed: Feb. 16, 1990

[30] Foreign Application Priority Data

Feb. 16, 1989 [NL] Netherlands .................... 8900379

[51] Int. Cl.$^5$ .................... B26B 27/00; A01G 5/00
[52] U.S. Cl. .................................... 83/446; 47/6; 47/1.01; 30/DIG. 3
[58] Field of Search ............... 83/446, 443, 856, 278; 30/191, 105, 239, DIG. 3; 56/239; 47/6, 101

[56] References Cited

FOREIGN PATENT DOCUMENTS 0021493  6/1980  European Pat. Off. .

Primary Examiner—Douglas D. Watts
Assistant Examiner—Allan M. Schrock
Attorney, Agent, or Firm—Helfgott & Karas

[57] ABSTRACT

A tool for obliquely severing flower stems comprises a housing having a passage for inserting thereinto a flower stem to be severed, and a cutting blade extending between the opposing side walls of the passage. The cutting edge of the cutting blade is directed in the inserting direction and obliquely towards a bottom wall of the housing. A spring blade is mounted to the bottom wall of the housing. The cutting blade is mounted relative to the spring blade in such a way that the cutting blade and the spring blade are at a minimum distance from each other in a non-use condition but are permitted to be pushed apart against the action of a slight force of the spring blade when a stem to be severed is inserted into the passage.

3 Claims, 1 Drawing Sheet

TOOL FOR OBLIQUELY SEVERING FLOWER STEMS

BACKGROUND OF THE INVENTION

The invention relates to a tool for obliquely severing flower stems, comprising a housing having a passage for inserting therein to a flower stem to be severed and a cutting blade extending between opposing side walls of the passage. The cutting edge of the cutting blade is directed in the inserting direction obliquely from one wall towards the opposite passage wall.

A known tool as described above is disclosed in EP No. 0021493 (vide the embodiment according to FIGS. 1-4). This known apparatus is expected to overcome the risk for incisions, on user's fingers, that may occur when the user severs flower stems by a pocket knife or a kitchen knife. This known tool is admittedly safe and is also easy to handle. The flower stem to be severed is merely introduced to the desired stem length into the housing and then is retracted from the housing. During the introduction of the stem the cutting blade remains inoperative but will tend to penetrate into and cut the stem when the latter is retracted.

However, the operation of this known tool, in which the cutting blade is in a fixed position relative to the walls of the insertion passage, is far from satisfactory. The more easily (i.e. with a greater a clearance a stem can be inserted, into the housing package the greater is the chance that the cutting blade will not immediately or insufficiently penetrate into the stem, whereby the severing action of the tool is restricted to a superficial scraping or peeling action of the blade on the flower stem. One may try to avoid this shortcoming by bending the flower stem while retracting the latter from the housing i.e. away from the passage wall opposite the cutting blade. Such a way of handling is, however, inconvenient to a user and is not sufficient to completely overcome the above mentioned shortcomings in the operation of the tool.

SUMMARY OF THE INVENTION

In accordance with this invention the problem above referred to has been solved in a simple and effective manner by providing a wall portion on a bottom wall of the housing and by mounting the cutting blade relative to the opposite wall portion in such a way that the blade and the wall portion are at a minimum distance from each other while the tool is in the non-use condition but are permitted, to spread from each other against a slight spring action of the wall portion when a stem is inserted into the tool.

In this manner, stems of various diameters may be easily inserted, while, on the other side the contact between the stem and the cutting blade, required for initiating the severing action when the stem is withdrawn, is provided under all circumstances.

In a preferred embodiment the cutting blade is in a fixed position relative to the housing, whereas the housing wall portion opposite to the cutting blade is formed by a wall strip which extends from the insertion end of the housing and is resiliently urged towards the cutting blade. The advantage of the fixedly-positioned cutting blade resides in that stems of various diameters can be severed at the same bias.

According to an embodiment of the invention the resilient wall strip is formed as a spring blade.

The invention will be hereinafter further described, by way of example, with reference to the accompanying drawing.

DETAILED DESCRIPTION OF THE PREFERRED EMBODIMENT

Figure 1:
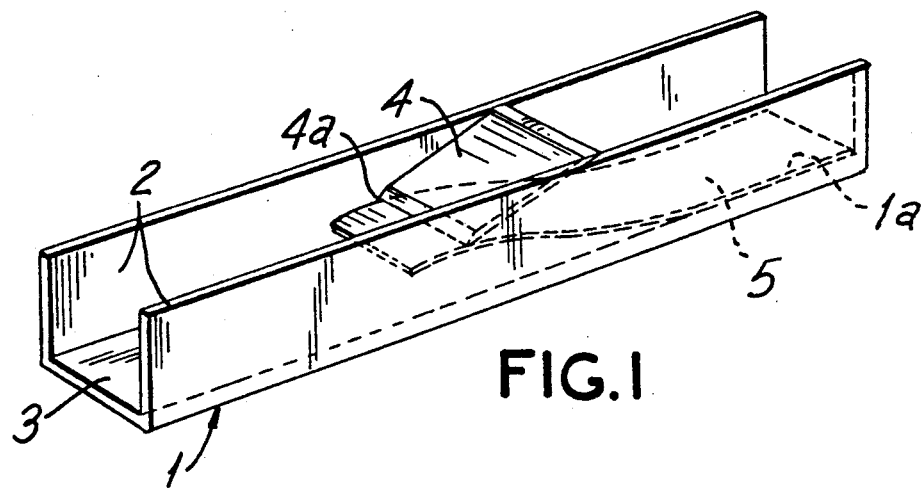
FIG. 1 is a perspective view of the tool according to the invention.

The tool shown in FIGS. 1 and 2A-2D includes a housing 1, formed e.g. of a suitable artificial resin and having two opposing longitudinal walls 2 and a bottom wall 3. A cutting blade 4 extends between the opposing longitudinal walls 2, the plane of which includes an acute angle to the bottom wall 3. The angle $\alpha$ substantially corresponds with the bias, at which the flower stems to be treated by the tool are to be severed. The cutting edge 4a of the cutting blade is directed obliquely to the direction of arrow I, in which a flower stem to be severed is inserted into the housing.

Figure 2A:
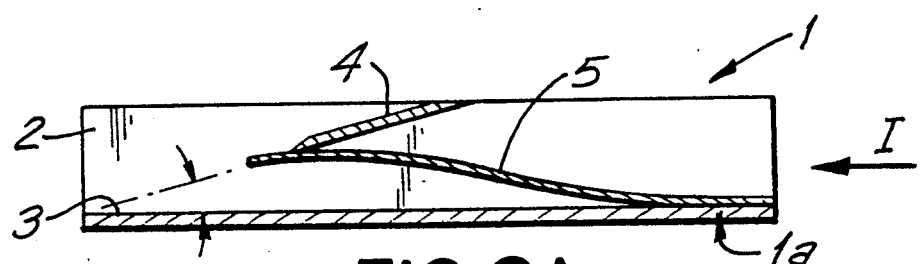
FIGS. 2A-D show longitudinal sectional views of the tool of FIG. 1 in four successive stages in use.
Figure 2B:
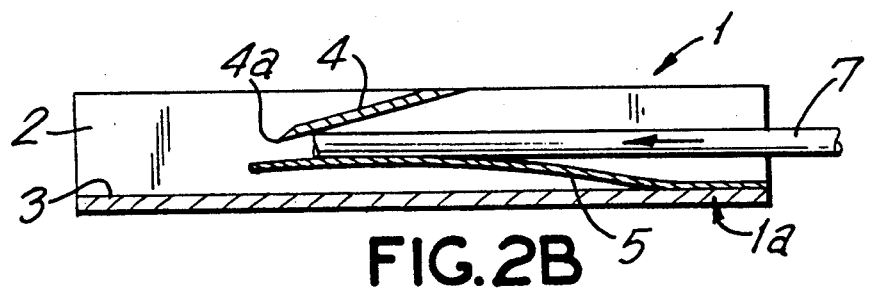

Reference numeral 5 designates a wall strip which is formed as a spring blade and is connected to the bottom wall 3 adjacent an insertion end 1a of the housing. The wall strip which is made of metal or a suitable artificial resin and may be formed as an integral part of the housing, engages the cutting edge 4a of the cutting blade 4 in the condition of non-use (FIG. 2A). The stiffness of the wall strip 5 is rather low so that the strip will readily make way when a flower stem 7 to be severed is inserted into the passage of the tool (vide FIG. 2B).

Figure 2C:
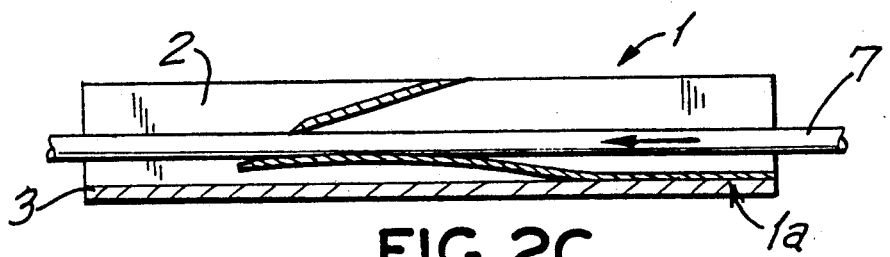
Figure 2D:
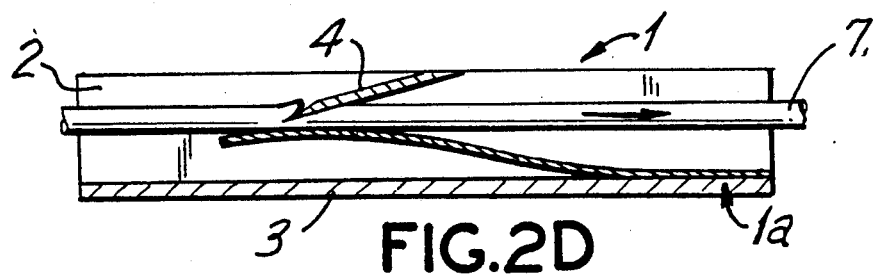

In FIG. 2C, the stem is shown inserted into the tool to the desired length. When withdrawing the stem from this position, the spring pressure exerted by the wall strip 5 causes the cutting blade 4 to immediately bite into the stem and also causes the stem to move transversally relative to the stationary cutting blade 4 as is required for a perfect severing (at a bias $\alpha$).

It will be clear that the above described tool is suitable for severing of flower stems of different size. If desired, the position of the cutting blade could be adjustable so as to enlarge the spacing between the cutting edge 4a and the bottom wall 3 for severing very thick stems.

It will be understood, that the safety of the tool can be improved by applying a cover wall. In that case the cutting blade will become enclosed and protected against direct manual contact.

In the first place the tool according to the present invention is to be seen as a handy handtool. It may, however, be mounted in a fixed position, i.g. in a downwardly inclined position relative to a receptacle for collecting the severed stem portions.

I claim:

1. A tool for obliquely severing flower stems, comprising a housing having a passage for inserting a flower stem to be severed thereinto; a cutting blade extending between two opposing side walls defining with a bottom wall of said housing said passage, said cutting blade having a cutting edge projecting in a direction of insertion of a flower stem and extending obliquely towards said bottom wall, and wall portion means provided on said bottom wall, said cutting blade and said wall portion means being mounted in said housing one relative to the other such that said cutting blade and said wall portion means are at a minimal distance from each other when the tool is in a non-use condition but are permitted to spread away from each other against a slight spring force of said wall portion means acting on a stem when a stem to be severed is inserted into said passage.

2. The tool according to claim 1, wherein said cutting blade is fixed to the housing, and said wall portion means is formed by a strip which extends from an end of insertion of said housing and is formed to be resiliently urged towards said cutting blade.

3. The tool according to claim 2, wherein said strip is formed as a spring blade.

* * * * *